United States Patent [19]

Poulin

[11] Patent Number: 4,705,657
[45] Date of Patent: * Nov. 10, 1987

[54] METHOD OF MAKING AND APPLYING ETHYLENE-PROPYLENE DIENE TERPOLYMER TEXTURIZED HEAT SHRINKABLE TUBING

[75] Inventor: Benoit L. Poulin, Hudson, N.H.

[73] Assignee: Essex Group, Inc., Ft. Wayne, Ind.

[ * ] Notice: The portion of the term of this patent subsequent to Mar. 18, 2003 has been disclaimed.

[21] Appl. No.: 728,972

[22] Filed: Apr. 30, 1984

Related U.S. Application Data

[62] Division of Ser. No. 584,677, Feb. 29, 1984, abandoned.

[51] Int. Cl.$^4$ .................... B29C 61/08; B29B 13/08
[52] U.S. Cl. .................... 264/22; 264/230; 264/342 R
[58] Field of Search ............ 264/22, 230, 342 R

[56] References Cited

U.S. PATENT DOCUMENTS

| | | | |
|---|---|---|---|
| 2,140,157 | 12/1938 | Huffman | 38/90 |
| 2,624,366 | 1/1953 | Pugh | 138/87 |
| 2,774,993 | 12/1956 | Hagen et al. | 264/230 |
| 3,303,243 | 2/1967 | Hughes et al. | 264/22 |
| 3,430,116 | 2/1969 | Johnstone | 264/230 |
| 3,435,107 | 3/1969 | Conrad | 264/274 |
| 3,513,429 | 5/1970 | Helsop | 337/382 |
| 3,576,387 | 4/1971 | Derby et al. | 174/36 |
| 3,717,717 | 2/1973 | Cunningham et al. | 174/73 R |
| 3,749,621 | 7/1973 | Shoffner | 156/86 |
| 3,847,183 | 11/1974 | Meyer | 138/96 R |
| 4,062,918 | 12/1977 | Nakanose | 264/132 |
| 4,101,699 | 7/1978 | Stine et al. | 264/22 |
| 4,207,364 | 6/1980 | Nyberg | 264/230 |
| 4,213,815 | 7/1980 | Goldberg et al. | 264/22 |
| 4,271,045 | 6/1981 | Steigerwald et al. | 252/511 |
| 4,310,367 | 1/1982 | Berejka | 264/230 |
| 4,325,998 | 4/1982 | Chapman | 428/36 |
| 4,341,921 | 7/1982 | Simpson | 174/84 R |
| 4,363,842 | 12/1982 | Nelson | 156/86 |
| 4,373,554 | 2/1983 | Cook | 138/137 |
| 4,399,060 | 8/1983 | Glass | 252/511 |
| 4,467,002 | 8/1984 | Crofts | 264/230 |
| 4,536,362 | 8/1985 | Donaldson | 264/177 R |
| 4,576,207 | 3/1986 | Levine et al. | 138/177 |

FOREIGN PATENT DOCUMENTS 56-162614 12/1981 Japan .................... 264/230
1092332 11/1967 United Kingdom .

Primary Examiner—Jeffery Thurlow
Attorney, Agent, or Firm—Alan C. Cohen

[57] ABSTRACT

A low temperature heat shrinkable ethylenepropylene diene terpolymer tubing is described which has a texturized surface. Upon applying the heat shrinkable tubing to a complex shaped object and exposing it to temperatures below 85° C., the tubing shrinks radially, linearly and uniformly so as to preserve the texturized friction surface, shrinking over depressions and expansions of the complex surface without wrinkling. In addition, a low temperature semiconductive heat shrinkable tubing is also disclosed.

2 Claims, 3 Drawing Figures

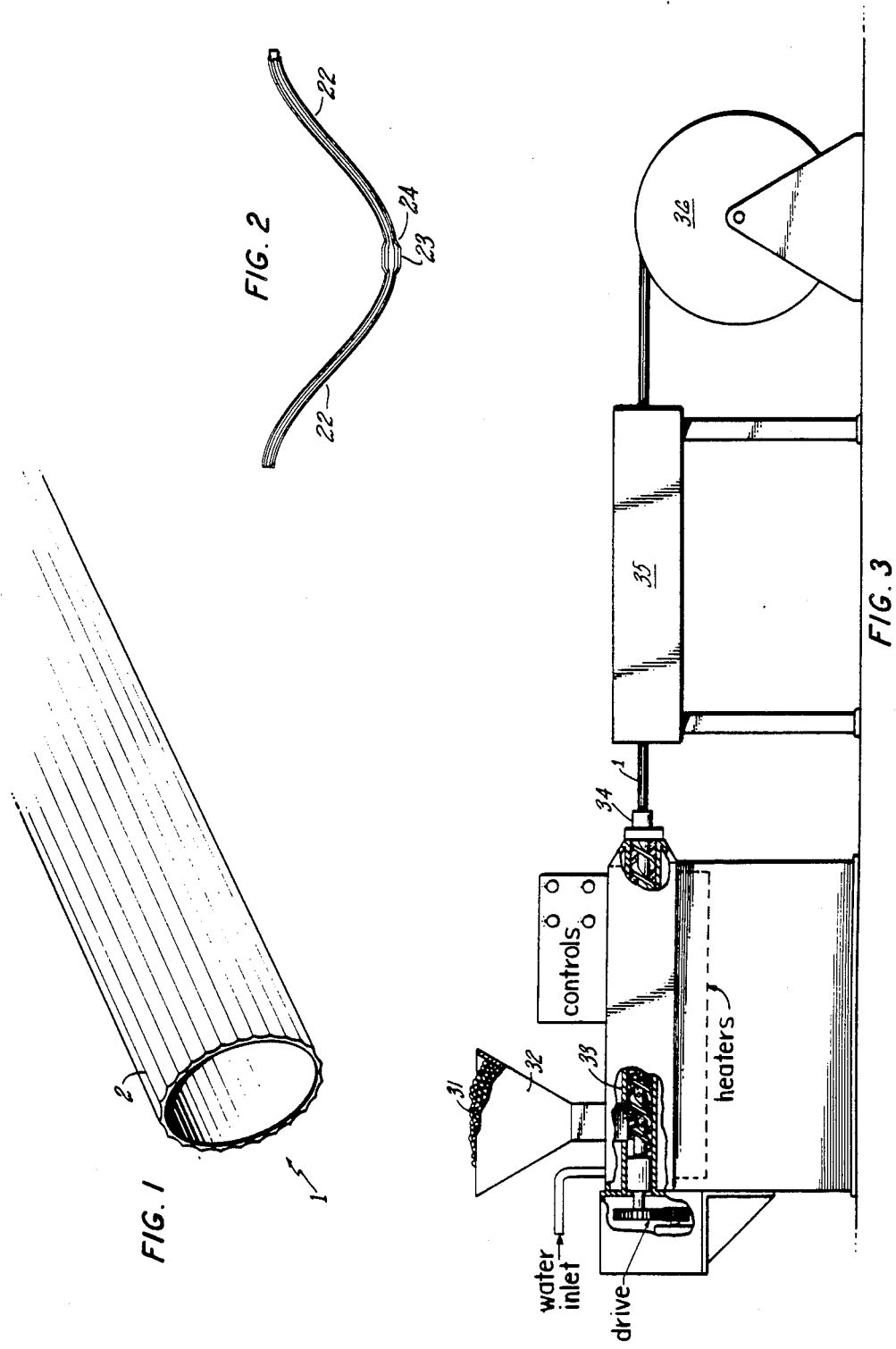

METHOD OF MAKING AND APPLYING ETHYLENE-PROPYLENE DIENE TERPOLYMER TEXTURIZED HEAT SHRINKABLE TUBING

CROSS REFERENCE TO RELATED APPLICATIONS

This is a division of application Ser. No. 584,677 filed on Feb. 29, 1984 now abandoned.

This application relates to application Ser. No. 465,719, filed Feb. 11, 1983 for Texturized Heat Shrinkable Tubing by H. Levine, S. Gerrato and B. Poulin, now U.S. Pat. No. 4,576,207, and application Ser. No. 563,845, filed Dec. 21, 1983 for Low Temperature Elastomeric Heat Shrinkable Tubing by B. Poulin now abandoned.

TECHNICAL FIELD

The field of art to which this invention pertains is heat shrinkable polymer tubing and methods of making the same.

BACKGROUND ART

Heat shrinkable tubing has been in existence for many years. The use of heat shrinkable tubing, when properly formulated, provides a quick and economical method of covering various materials for a variety of purposes. For example, heat shrinkable tubing may be applied to a material for electrical insulation purposes, for protection against the elements, or to improve the feel of the material to the hand. Because of the wide variety of uses of such material there is an ongoing search for ways to improve the tubing itself, the manner in which it can be applied, improvement in its appearance, and its performance in the heat shrink operation. For example, it has been known that when applying heat shrinkable tubing to complex shaped articles containing many bends, expanded and depressed areas, the tubing can have a tendency to wrinkle upon shrinkage, particularly at the inside radius of curved portions of the article to be covered. In addition, the material from which these tubings are made, such as polyolefins, polyvinylidene fluoride, polytetrafluoroethylene, fluorinated ethylene propylene and resin modified polychloroprene, offer little or no cushioning effect, become brittle in cold weather and do not have very much flexibility. A further drawback to heat shrinkable materials of this type is their relatively high shrink temperatures, i.e. typically above 100° C. Accordingly, any improvements in heat shrinkable tubing have the potential of opening up entire new areas of use for such articles.

DISCLOSURE OF INVENTION

The present invention is directed to an ethylene propylene diene terpolymer low temperature heat shrinkable tubing extruded with raised portions on its surface so as to provide improved properties and performance of such tubing in use. Such improved performance can take the shape of improved gripability, aesthetic appearance, heat dissipation, electrical insulating properties, lower shrink temperatures, etc. The tubing is also formed so as to have a substantially lengthwise shrinkage so when placed over a material to be covered, it conforms to bends, depressed and expanded areas with no wrinkling. The raised portions on the tubing are also extruded onto the heat shrinkable tubing so as to provide maintenance of a textured pattern even after heat shrinking.

Another aspect of the invention includes a method of making such tubing by melting ethylene-propylene diene terpolymer in an extruder barrel, extruding the polymer through a forming die so as to produce a textured pattern, irradiating the tubing and expanding it and cooling the expanded material to form the heat shrinkable tubing. The expansion and cooling may be performed under tension here (as well as elsewhere in the manufacturing process) so as to provide a negative elastic memory, thus ensuring the above-described smooth conformity to complex shaped substrates.

The foregoing, and other features and advantages of the present invention, will become more apparent from the following description and accompanying drawings.

BRIEF DESCRIPTION OF DRAWINGS

FIG. 1 shows a typical heat shrinkable tubing according to the present invention.

FIG. 2 shows a typical heat shrinkable tubing according to the present invention after heat treatment on a complex shaped article.

FIG. 3 shows typical apparatus useful for forming tubing according to the present invention.

BEST MODE FOR CARRYING OUT THE INVENTION

Elastomeric, low temperature, heat shrinkable tubing may be formed using any ethylene-propylene diene terpolymer (EPDM) which is capable of being cross-linked by electron beam irradiation. One such material is Irracure 361 (Reichhold Chemical Company) and is the preferred material. It is theorized that in forming the heat shrinkable tubing, it is the inherent crystalline structure within the EPDM material which maintains the tube in its expanded form. During formation of the tube this crystalline material is melted by raising the temperature of the polymer above the melt temperature of the crystalline material. The tube is then expanded and then cooled below the recrystallization temperature of the crystalline material. The recrystallized structure then maintains the tube in its expanded shape until it is again melted by raising the tube temperature above the crystalline melt temperature, at which time the tube shrinks to approximately its original shape. Such EPDM material typically varies in composition from about 80% to about 50% ethylene and about 20% to about 50% propylene with up to 5% unsaturated diene terpolymer. Typically the diene terpolymers which may be useful are cyclic alaphatic dienes, such as hexadiene dicyclo-penta-diene or ethylene-diene-norbornene, etc. These EPDM materials should be peroxide free and although it is not necessary for the production of these shrinkable tubings, it is advisable to include conventional irradiation promoters in order to reduce the dosage of irradiation required to facilitate crosslinking. These promoters are conventional and include, but are not limited to, acrylates and cyanurates. A few examples of each are:

Tetraethylene Glycol Diacrylate
1,6 Hexanediol Diacrylate
Diethylene Glycol Diacrylate
Trimethylol Propane Triacrylate
Triethylene Glycol Diacrylate
Neopentyl Glycol Diacrylate
Isodecyl Acrylate
2,3 Dibromopropyl Acrylate Ethylene Glycol Dimethacrylate
Tetrahvdrofurfuryl Methacrylate
Tetraethylene Glycol Dimethacrylate
1,3 Butylene Glycol Dimethacrylate
Trimethylol Propane Trimethacrylate
Triethylene Glycol Dimethacrylate
Diethylene Glycol Dimethacrylate
Dimethylamino Ethyl Methacrylate
Polyethylene Glycol 600 Dimethacrylate
Trimethylol Propane Trimethacrylate Generally these additives are introduced in the range of about 1 to about 10 percent by weight.

While the EPDM material can be used unmodified, it is more typically used with conventional modifiers such as antioxidants, fillers, processing aids, etc., which impart improved thermal, mechanical, electrical and flame retardency characteristics to the material.

In addition to the heat shrinkable tubing as described above, semiconductive heat shrinkable tubing using the same method may be prepared with the EPDM material as described through the addition of electrically conductive particles to the terpolymer material. Such electrically conductive EPDM material is commercially available from Reichhold Chemical Company as EPDM 95-227 and is the preferred material. Such materials may be prepared as well, from the base EPDM polymer by the addition of electrically conductive particles such as carbon black, metallic balloons or silver-plated copper, or other conventional materials which are used to make semiconductive materials. The preparation of the semiconductive EPDM, through the addition of the electrically conductive particles, may be performed by conventional processing techniques. The electrically conductive materials are typically added in concentrations of from about 30% to about 60% by weight of the EPDM material. Tubings utilizing this semiconductive EPDM shrink tubing are particularly useful as cable coverings during splicing operations. When used in this manner, the semiconductive material should have a resistance of less than 5,000 ohms per centimeter square. Heat shrinkable tubing formed using these materials will shrink at temperatures from about less than 85° C. and typically from about 65° C.-85° C.

Melted EPDM polymeric material is placed in an extruder head and extruded through a forming die so as to produce a tube having substantially parallel raised portions on its outer surface. These raised portions being substantially perpendicular to the circumference of the tube. The inner diameters and thicknesses of the tubing vary depending on the intended use of the product but will typically range from about 40 mils to about 5 inches in expanded inside diameter with recovered wall thicknesses ranging from 5.0 mils to 0.3 inch.

While the preferred texturized patterns on the heat shrinkable tubing are raised, substantially parallel lines (a "corduroy" pattern), any pattern which provides raised or uneven portions on the surface of the otherwise smooth tubing are acceptable. For example, intermittent rather than continuous lines may be used.

The extruded tubing is then exposed in dosages ranging from about 0.5 to about 30 megarads of electron beam irradiation at levels of about 0.5 to about three million electron volts, causing partial cross-linking (at least 30%) in the EPDM material. It is believed that the power of the beam and the dosage of the exposure is dependent on the wall thickness of the tube. In addition, it has been determined that in certain instances, i.e. where the tubing wall thickness is large, that the total irradiation dosage should be accomplished in several passes, each pass comprising a small dosage until the entire dosage is achieved. Also, it may be advisable to rotate the tubing during each pass: this will ensure relatively even cross-linking throughout the material. It is not possible to determine exactly how much irradiation is required. However, too much irradiation will result in tubing that will be defective, i.e. will inadequately expand or will split when expanded. Too little irradiation will result in the tube failing to shrink properly or splitting when shrunk around the substrate.

The resulting cross-linked tubing is then reheated and a positive pressure is applied to the inside of the heated tubing to cause the desired radial expansion while at the same time the desired degree of linear shrinkage is imparted by holding the heated tubing in tension.

As formed, the heat-shrink material according to the present invention typically contains about 5% to about 30% longitudinal shrinkage memory. Such memory is built into the tubing by processing under tension as described below. This allows the tubing to be heat-shrunk over a variety of complex shapes without creasing, crimping or wrinkling upon shrinkage onto the intended substrate. Furthermore, the texturized surface shrinks uniformly not only providing a comfortable friction-gripable surface but a pleasant decorative finish as well. Because its surface has been increased by the texture, the ability of this tubing to dissipate heat during use is substantially increased.

In FIG. 1 the heat shrinkable tubing 1 is shown with raised ribs 2. A comparison with FIG. 2 showing the same tubing with the same ribs after heat shrinkage over a metal bar, demonstrates the uniformity of the tubing of the present invention.

Referring to FIG. 3 a better understanding of the method is demonstrated. Polymeric pellets or granules 31 are added to the extruder hopper 32. The polymeric material is reduced to a plastic state in the heated barrel 33 of the extruder and is forced by a rotating screw in the barrel 33 through extrusion head 34. The extruded tubing immediately is drawn through cooling bath 35 while it is held in tension. Following exit from the cooling bath the tubing is wrapped up on take-up reel 36. Following extrusion and take-up, the tubing is unwound, irradiated and then reheated, for example, by passing it through a heating fluid (such as Carbowax). A positive pressure (e.g. air) is imparted to the inside of the heated tubing to cause the desired degree of radial expansion. At the same time, the desired degree of linear shrinkage characteristics are imparted to the reheated tubing by holding it in tension, for example between a pinch roller and capstan device.

Shrinkage of the extruded tubing is effected by any heat source conventionally used in this art such as a hot air blower, infrared heater, oven, heat tunnel, etc. Since a 5% to 30% longitudinal shrinkage memory is built into the tubing, a corresponding linear excess of material should be used to ensure proper coverage of any article being covered.

As stated, FIG. 2 shows a typical application for the heat shrinkable tubing according to the present invention for a complex shaped handle grip with extensive bends 22, bulges 23, and depressions 24 covered with the heat shrinkable tubing according to the present invention and heated with a forced hot air dryer. As can be seen from the figure, a smooth wrapped handle grip results with evenness of the textured pattern providing a uniform, decorative and comfortable grip. As can be appreciated such product is particularly useful for: tennis racket handles, bats, hammers, ax handles, shovels, roller covers for powered conveyors, corrosion protection with increased heat transfer efficiency for heat transfer tubes, combined heat dissipation and electrical protection for sensitive electrical and electronic parts, anti-rattle coverings for automotive harnesses, comfort grip handle covers for lawnmowers, snowblowers, bicycle handlebars, etc. It should be noted that by virtue of its greatly increased surface area as compared to conventional smooth heat shrinkable tubings, heat transfer by this improved product is greatly enhanced.

It should also be noted that lower shrink temperatures which these tubings have, make them easier to apply and allow them to be used to cover objects which, for one reason or another, should not be heated above 85° C. In addition, the rubberelastomeric nature of this material offers a more resilient and soft feel to the tubing than does the plastic material of the prior art.

While this invention has been described for a tubing which incorporates an appreciable degree of longitudinal shrinkage which provides for smooth crimp-free application to curved and bent substrates, a textured product to be applied to straight substrates, where lengthwise shrinkage is not needed can also be made without significant lengthwise shrinkage.

Although this invention has been shown and described with respect to detailed embodiments thereof, it will be understood by those skilled in the art that various changes in form and detail thereof may be made without departing from the spirit and scope of the claimed invention.

I claim:

1. A method of making a heat shrinkable tubing consisting of:

melting ethylene-propylene diene terpolymer material, extruding the melted terpolymer through a die to produce a tubular structure having substantially parallel, raised portions extending along the tube's exterior surface substantially perpendicular to the tube's circumference, irradiating the extruded tube to partially cross-link the extruded terpolymer tube, heating the tube above the terpolymer crystallization temperature, imposing a positive pressure to the interior of the heated tube to impart radial shrinkage memory to the tubing while holding the heated tubing under linear tension to provide about 5 percent to about 30 percent longitudinal shrinkage memory to the tubing, cooling the tubing in the expanded state, thereby resulting in a tubing which shrinks radially and longitudinally with a smooth crimp-free application to curved and bent substrates while retaining its textured pattern.

2. A method of applying a textured ethylene-propylene diene terpolymer covering onto a complex shaped object comprising:

placing a heat shrinkable tubing having substantially parallel raised portions externally along the tube's exterior surface, which are substantially perpendicular to the circumference of the tube and wherein the tube is capable of shrinking radially as well as longitudinally, upon being exposed to heat, heating said tubing to cause it to shrink about the object thereby forming a crimp-free, wrinkle-free cover having a textured surface.

* * * * *